Jan. 6, 1953   V. A. NEDZEL   2,624,783
APPARATUS AND METHOD FOR MEASURING MAGNETIC FLUX
Filed June 4, 1945   2 SHEETS—SHEET 1
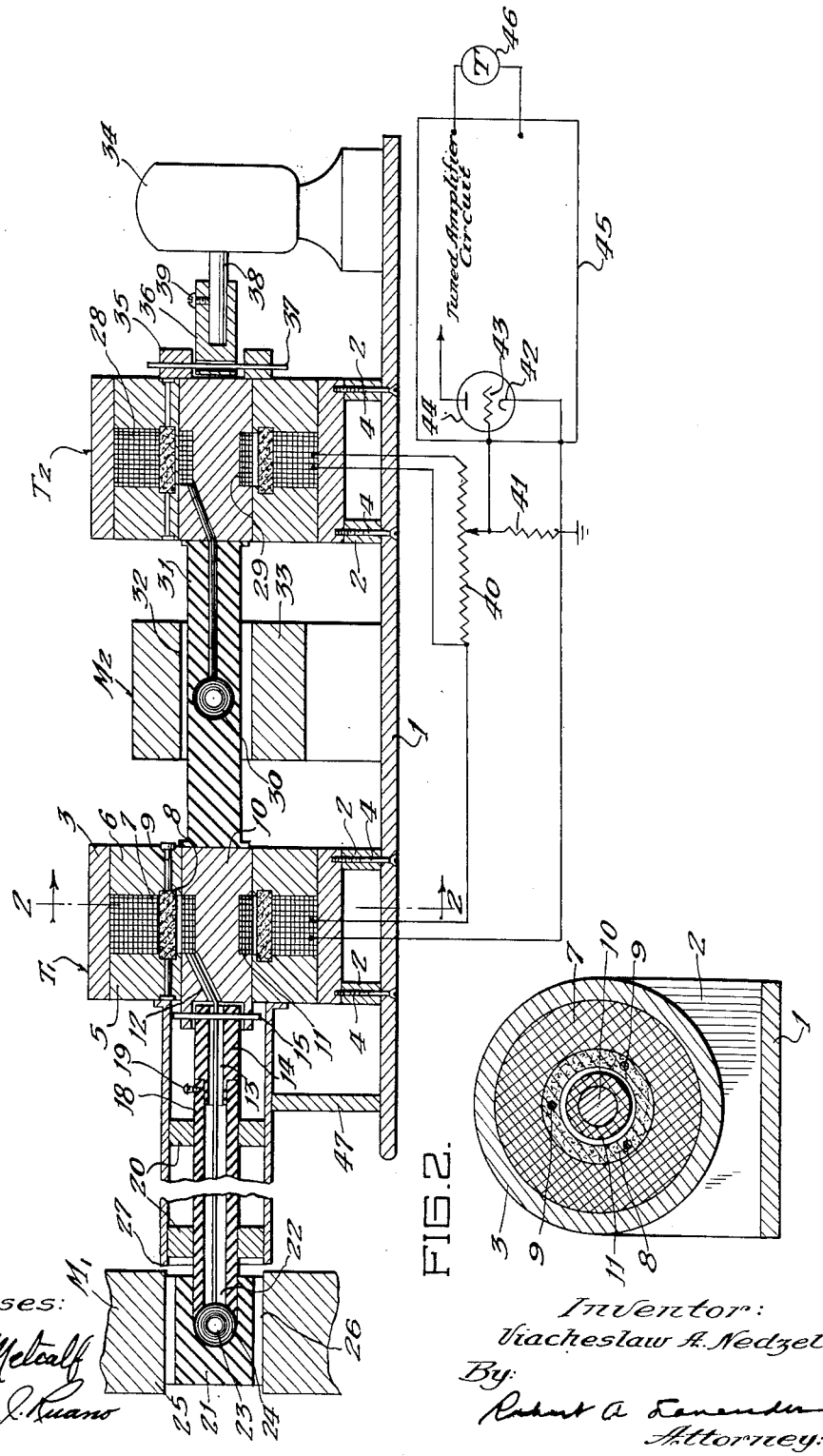

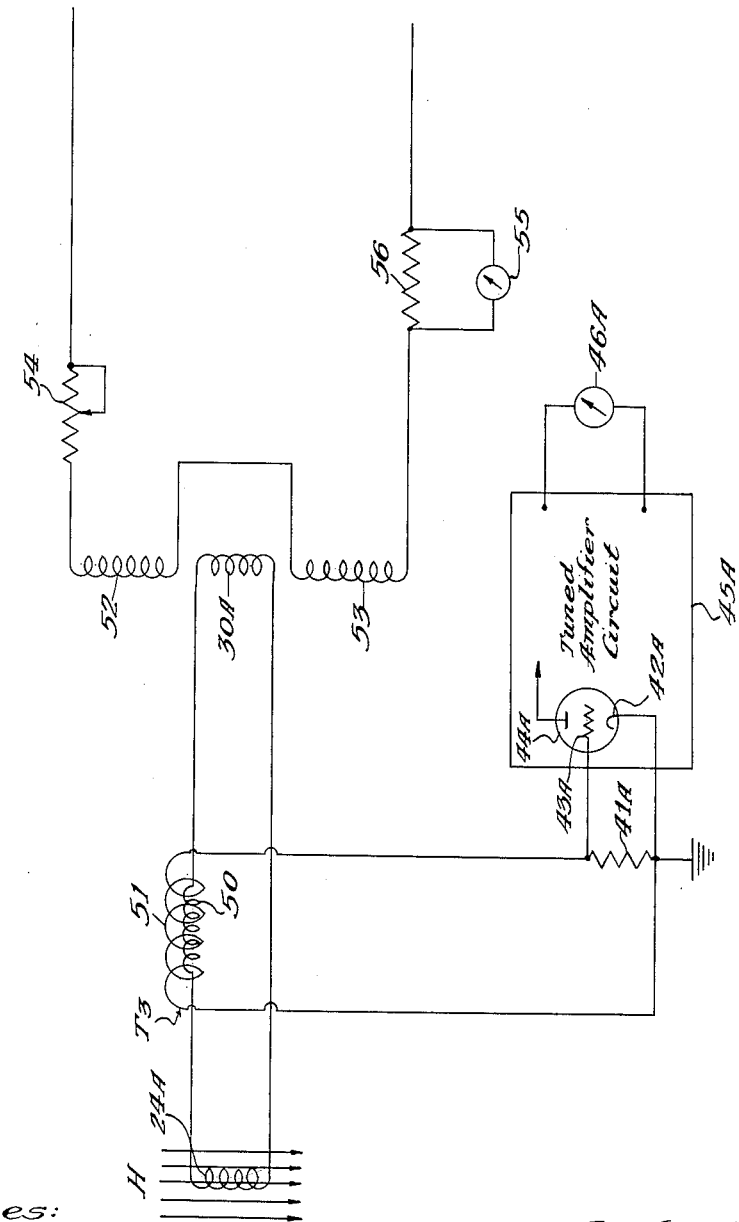

Patented Jan. 6, 1953

2,624,783

UNITED STATES PATENT OFFICE 2,624,783

APPARATUS AND METHOD FOR MEASURING MAGNETIC FLUX

Viacheslaw A. Nedzel, Chicago, Ill., assignor to the United States of America as represented by the United States Atomic Energy Commission Application June 4, 1945, Serial No. 597,475

10 Claims. (Cl. 175—183)

The present invention relates to an apparatus and method for measuring the flux density of a magnetic field.

In the past, the accuracy of spectrometric and cyclotronic measurements has been limited due to the fact that the flux density of the magnetic field, which is a factor in such measurements, has been measured, at best, to only a fair degree of accuracy. A common type of instrument for measuring magnetic flux is the flux meter. Such meters, however, measure to an accuracy of about 1 per cent which is not precise enough for certain measurements, such as certain mass spectrometric measurements. Another disadvantage of the flux meter is that it is a delicate instrument, usually including a galvanometer, and is therefore not readily portable or adapted for a wide variety of field flux measurements.

An object of the present invention is to provide a novel method and apparatus for measuring magnetic flux density devoid of the above-mentioned disadvantages.

A more specific object of the present invention is to provide a novel apparatus for measuring magnetic flux which is devoid of sliding electrical contacts and which employs a null method of comparison whereby a voltage generated by rotating a coil in a magnetic field of known flux density is bucked against the voltage generated by another coil rotating in a field whose flux density is to be measured.

A further object of the present invention is to provide apparatus for measuring magnetic field flux to a high degree of accuracy which apparatus is relatively simple, rugged, and easy to operate.

Other objects and advantages will become apparent from a study of the following specification taken with the drawings wherein:

Fig. 1 is a cross-sectional view of apparatus embodying the principles of the present invention, wherein the electrical circuit portion thereof is illustrated schematically;

Fig. 2 is a cross-sectional view of the apparatus of Fig. 1 taken along line 2—2 thereof; and Fig. 3 is a schematic illustration of a modification of the circuit shown in Fig. 1.

Referring more particularly to Figs. 1 and 2, numeral 1 denotes a base plate upon which are supported a plurality of arcuate supporting members 2 which are secured to base plate 1 and to transformers $T_1$ and $T_2$. Since these transformers are of identical construction only one ($T_1$), will be described in detail.

Transformer $T_1$ includes a hollow cylindrical member 3 secured to support members 2 and base plate 1 by means of bolts 4. Cylindrical member 3 is made of mild steel or other magnetic material. A pair of rings 5 and 6, also made of magnetic material, telescopically fit in the interior walls of cylindrical member 3 and together with cylindrical member 3 form a stationary support for mounting a secondary winding 7 of the transformer $T_1$. Secondary winding 7 may be wound on a hollow cylinder 8 of insulating material such as, for example, Bakelite or Lucite. The ends of cylinder 8 fit into peripheral grooves formed on the inside facings of rings 5 and 6. A plurality of bolts 9 extend through cylinder 8 and clamp rings 5 and 6 and cylinder 8 together. If desired, secondary winding 7 may be separately wound and snugly fitted between rings 5 and 6, in which case insulating cylinder 8 may be omitted. Rings 5 and 6 provide bearings for a rotor 10, also of magnetic material, such as, for example, mild steel, which rotor has an annular recess therein for supporting a primary winding 11. Primary winding 11 is rigidly secured to rotor 10 so as to rotate therewith. The lead-in wires of the primary winding 11 extend through a hole 12 in the rotor 10 and through a hole 13 in an insulating sleeve 14 that is coupled to rotor 10 by means of a pin 15. Pin 15 is preferably made of rubber or other yieldable material and extends through radially disposed holes in a flange portion of rotor 10 and in sleeve 14. A hollow cylinder 18 of insulating material is fastened to sleeve 14 by means of set screw 19. A plurality of sleeve bearings 20 are provided to act as a journal for the cylinder 18. Bearings 20 telescopically fit inside a hollow cylinder 27 preferably made of metal and rigidly supported on base plate 1 by support 47. At the left extremity of cylinder 18, as illustrated, there is provided a solid non-magnetic insulating cylinder 21 having a hole 22, extending axially through a portion thereof for accommodating lead-in wires from primary winding 11 and another hole 23 extending radially thereof for accommodating a search coil 24. Coil 24 is connected in series or loop circuit relationship with the primary winding 11 of the transformer $T_1$. Furthermore, coil 24 is rotated in a magnetic field created between pole pieces 25 and 26 of a magnet $M_1$ (shown broken away) whose magnetic flux is to be measured.

Transformer $T_2$, as mentioned hereinabove, has a construction identical to that of transformer $T_1$ and comprises a stationary secondary winding 28 and a rotatable primary winding 29. Primary winding 29 is connected in loop circuit relationship with a coil 30, which extends radially through a hole in the solid insulating cylindrical rotor 31 of Bakelite, Lucite, or other similar non-magnetic material, rigidly coupled to the metallic rotors encircled by transformers $T_1$ and $T_2$. Coil 30 is disposed within a magnetic field of known flux density existing between pole pieces 32 and 33 of a permanent magnet $M_2$ made of Alnico or other magnetic material and serving as a standard. Pole pieces 32 and 33 are preferably rotatably adjustable about the axis of rotor 31 with respect to coil 30 so that the pole faces thereof may be adjusted with respect to the pole faces of pole pieces 25 and 26 so that the magnetic field of known density formed by magnet $M_2$ may be made parallel with the magnetic field of unknown density formed by magnet $M_1$. It should also be noted that the radially extending holes in insulating rotors 21 and 31 which support coils 24 and 30, respectively, also have their axes in the same plane so that the voltages generated by the respective coils will attain maximum value at the same time as a result of rotation of these mechanically coupled rotors such as by a motor 34. Motor 34 is coupled to the rotor portion of transformer $T_2$ through a flange 35 attached to the rotor of $T_2$ through a sleeve 36 by a pin 37. Sleeve 36 is adjustably coupled to motor shaft 38 by means of set screw 39.

While set screw 19 may be loosened to make the axes of coils 24 and 30 parallel, it should be noted that a simpler method would be to make a coarse adjustment by this method, that is, by loosening of the set screw 19 to enable rotation of cylinder 18 with respect to sleeve 14 and thereafter make a fine adjustment electrically, that is, by noting what relative position of coils 24 and 30 gives a minimum resulting voltage, assuming that coils 24 and 30 are interconnected in opposition or in the bucking relationship with the primary windings 11 and 29, respectively, in a circuit to be described hereinafter.

The electrical circuit interconnecting secondary windings 7 and 28 of transformers $T_1$ and $T_2$ includes a potentiometer resistor 40 which acts as a voltage divider so as to enable selection of any portion of the voltage generated by rotation of primary winding 29 appearing at the input terminals of potentiometer resistor 40. This selected portion of the voltage appearing across the output terminals of potentiometer resistor 40 is connected in series and in opposition to the voltage generated by primary winding 11. The resultant voltage, that is, before complete bucking exists, is applied across a resistor 41 of fairly high value, say, for example, 100,000 ohms, which is connected between the cathode 42 and input grid 43 of an electron tube 44. Tube 44 comprises the first stage of any well-known type of tuned amplifier circuit which is tuned to the frequency of rotation of the motor shaft 38. For example, if the motor 34 is driven at 1800 R. P. M. the amplifier circuit would be tuned to a frequency of 30 cycles per second. By providing a tuned amplifier circuit extraneous harmonics and voltages picked up as a result of vibration of certain parts at other than 30 cycles per second will not be transmitted through the amplifier circuit, and, therefore, will not be ultimately measured at the output of such circuit such as by meter 46. By the above described circuit, there is no need for using sliding electrical contacts for transmitting the voltages picked up by the coils 24 and 30 to the amplifier and metering circuit, thereby eliminating errors due to varying contact resistance such as caused by the use of slip rings.

Inasmuch as the flux density of the magnetic field of magnet $M_2$ in which coil 30 rotates is known, it is possible to calibrate the potentiometer 40 in terms of magnetic field density and to adjust or select any portion of the output voltage existing across the extreme terminals (input terminals) of the potentiometer 40 for measuring different magnetic field densities produced by other magnets than $M_2$ and apply such pre-selected portion in series and in bucking relationship with the voltage generated by rotation of coil 24 in an unknown field. To determine when the proper value of voltage is selected by adjustment of potentiometer 40 so as to be equal and opposite to that generated by coil 24, the operator notes when meter 46 reads a minimum or zero value of output voltage.

Fig. 3 shows a modification of the circuit shown in Fig. 1 wherein a single transformer $T_3$, of identical construction to either transformer $T_1$ or transformer $T_2$ of Fig. 1, is used. The transformer $T_3$, however, is shown only schematically for the purpose of simplicity and includes a rotatable primary winding 50 and a stationary secondary winding 51. Instead of using a permanent magnet to create a magnetic field of known flux density, a pair of magnetic field producing solenoid coils 52 and 53 are substituted. Coils 52 and 53 are co-axial and preferably have an air core, although in cases where extreme accuracy is not important, a core of magnetic material such as iron may be used to create a denser magnetic field. Standard coil 30A mounted on the shaft in the same manner as coil 30 of Fig. 1 rotates in the magnetic field produced by coils 52 and 53, and is preferably spaced therefrom by the Helmholtz separation.

Search coil 24A similar to coil 24 of Fig. 1 rotates in the magnetic field H whose density is to be measured and is connected in series with coil 30A, and with the primary winding 53 of transformer $T_3$ to form a loop circuit. The proper connections with coils 24A and 30A are made so that the voltage generated thereby will be in opposition or bucking relationship. If desired, a reversing switch (not shown) may be used to facilitate such connections.

The secondary winding 51 of the transformer $T_3$ is connected across a grounded resistor 41A of high value and to the input grid 43A and cathode 42A of input tube 44A forming the first stage of any well-known type of tuned amplifier 45A. This amplifier is tuned, as before described, to the frequency of rotation of coils 24A and 30A.

The circuit is adjusted as follows: coils 24A and 30A are relatively adjusted so that their axes are in substantially the same plane, that is, to the extent possible by mechanical adjustment of the shaft portions as described in connection with Fig. 1. The shaft carrying the coils 24A and 30A and primary winding 50 is then rotatably driven by a motor. Coil 24A is inserted in a magnetic field of known flux density such as a standard permanent magnet. The current flowing through the coils 52 and 53 is then adjusted by variable resistor 54 until the field intensity is of a value so that the induced voltage in coil 30A is substantially equal to the induced voltage in coil 24A which it opposed. Since the transformer $T_3$ induces the difference between these voltages in the secondary winding 51, it may be determined when these voltages buck each other completely by noting the reading of a meter 46A connected in the output of the amplifier circuit 45A. After a minimum value of output current is detected by meter 46A, which indicates that the current flow through coils 52 and 53 is correct, the motor is stopped and coils 24A and 30A are again manually rotated slightly with respect to each other to make sure their axes are parallel. The motor is then started again. When, by successive adjustment of the coils 24A and 30A, a minimum reading of meter 46A is attained, this will be an indication that the axes of coils 24A and 30A are truly parallel. Coil 24A is then withdrawn from the magnetic field of known flux density and inserted into a magnetic field whose density is to be measured. Due to the fact that coils 52 and 53 have air cores, the current flow through these coils will vary linearly with the magnetic field density of the magnetic field H extending through coil 24A. For example, if the magnetic field density of the unknown field is three times as much as that of the standard field, the current reading by milliammeter 55 shunted by resistor 56, will be three times as much. Hence the milliammeter 55 (or resistor 54) may be calibrated in terms of magnetic field density. If an iron core were used instead of an air core in coils 52 and 53, the current reading may not be quite as high as three times the value of that for a standard field because the magnetic field density of such an electromagnet does not vary linearly with magnetizing current due to saturation.

The circuit in Fig. 3 is an improvement over that shown in Fig. 1 inasmuch as the transformer T3 transmits only the unbalanced portion of the current and so the characteristics of the transformer T3 will not, in general, affect the linearity of the instrument (i. e., the linearity of the measured field with the current in the standard field coils 52 and 53) therefore allowing the use of an inexpensive transformer. In Fig. 1, on the other hand, matching of the saturation characteristics of transformer T1 and T2 is required. Furthermore, no voltage divider, such as potentiometer 40 in Fig. 1, need be used in balancing one E. M. F. (or voltage) against the other in the sensitive input circuit of the amplifier since the two E. M. F.'s are made equal by adjusting the current in the standard field coils 52 and 53.

The circuit shown in Fig. 3 is also an improvement over well-known types of flux meters since it measures magnetic field intensity to an accuracy at least ten times that of conventional flux meters. Furthermore, instead of using a galvanometer as the current measuring instrument as is customary with flux meters a milliammeter or any other standard type of current measuring device which is more rugged than a galvanometer may be connected in series with coils 52 and 53.

It will be seen, therefore, that I have provided simple, inexpensive, rugged, highly efficient, and reliable apparatus, devoid of slip rings or other sliding electrical contacts as well as a new method for measuring magnetic field flux density by employing a novel method of comparison between a standard field and an unknown field. Thus, while I have shown two modifications of specific apparatus whereby the method of my invention may be practiced, it will be appreciated that the method may be practiced by use of other apparatus or specifically by hand, such as by inserting a conductor in each of two magnetic fields, of one of which the magnitude is known, moving the conductor in each field, such as by withdrawing the conductor from each field to produce electromotive forces, combining said forces in opposition one to the other, and measuring the magnitude of the resultant electromotive force to determine the magnitude of the other magnetic field.

It should be noted that modifications of the above described embodiments will readily be suggested to those skilled in the art after having had the benefit of the teachings of my invention. For this reason the invention should not be limited except insofar as set forth in the following claims.

I claim:

1. Apparatus for measuring magnetic field strength by comparison with a standard, comprising a rotatable shaft, a search coil rigidly supported by said shaft and rotatable in a magnetic field whose strength is to be measured, means to produce a magnetic field of fixed flux density, a standard coil also rigidly supported by said shaft and rotatable in said magnetic field, a pair of transformers, each including a primary winding in series circuit relationship with one of said coils and being wound about and rigidly secured to portions of said shaft so as to be rotatable therewith, each of said transformers also including a secondary winding and a stationary magnetic yoke surrounding and supporting the secondary winding, said magnetic yokes completing a transformer magnetic circuit which includes said primary windings, and a potentiometer circuit connected to said secondary windings for comparing the voltages induced therein.

2. Apparatus for measuring magnetic field strength by comparison with a standard, comprising a rotatable shaft, a search coil rigidly supported by said shaft with its axis at right angles thereto and rotatable in a magnetic field whose intensity is to be measured, means to produce a magnetic field of fixed flux density, a standard coil also rigidly supported by said shaft and having its axis at right angles thereto, said standard coil being rotatable in said magnetic field of fixed flux density, a pair of transformers each having a primary winding in series circuit relationship with one of said coils and a secondary winding surrounding said primary winding and co-axially disposed with respect to said shaft and primary winding, said primary windings being wound about and rigidly secured to portions of said shaft so as to be rotatable therewith, each of said transformers including a stationary magnetic yoke serving as a bearing support for said shaft, said magnetic yokes completing magnetic circuits which include said shaft portions, and a potentiometer circuit for comparing a selected portion of the voltage induced in one of said secondary windings with that induced in the other by having said voltages in bucking relationship to afford a null method of comparison.

3. Apparatus for measuring magnetic field strength by comparison with a standard, comprising a rotatable shaft, a search coil rigidly supported by said shaft and rotatable in a magnetic field whose flux density is to be measured, means to produce a magnetic field of fixed flux density, a standard coil also rigidly supported by said shaft and rotatable in said magnetic field of fixed density, a pair of transformers, each including a primary winding in series circuit relationship with one of said coils and being wound about and rigidly secured to portions of said shaft so as to be rotatable therewith, each of said transformers also including a secondary winding and a stationary magnetic yoke surrounding and supporting the secondary winding and serving as a bearing support for said shaft, said magnetic yokes completing a transformer magnetic circuit which includes said shaft portions, voltage dividing means having input terminals connected across the secondary winding associated with said magnetic field of known density, circuit means including electronic amplifying and measuring means connected in loop circuit relationship with output terminals of said voltage dividing means and with the said secondary winding associated with said magnetic field whose flux density is to be measured so that the voltages generated are in bucking relationship.

4. Apparatus for measuring magnetic field strength by comparison with a standard, comprising a rotatable shaft, a search coil rigidly supported by said shaft and rotatable in a magnetic field whose field strength is to be measured, means to produce a magnetic field of fixed flux density, a standard coil also rigidly supported by said shaft and rotatable in said magnetic field of fixed strength, a pair of transformers, each including a primary winding in series circuit relationship with one of said coils and being wound about and rigidly secured to portions of said shaft so as to be rotatable therewith, each of said transformers also including a secondary winding and a stationary magnetic yoke surrounding and supporting the secondary winding and serving as a bearing support for said shaft, said magnetic yokes completing a transformer magnetic circuit which includes said shaft portions, voltage dividing means having input terminals connected across the secondary winding associated with said magnetic field of known strength, circuit means including electronic amplifying and measuring means whose input is connected in loop circuit relationship with output terminals of said voltage dividing means and with the said secondary winding associated with said magnetic field whose strength is to be measured so that the voltages generated are in bucking relationship, said amplifying means being tuned to the frequency of rotation of said shaft so as to prevent transmission by said amplifying means of harmonic and stray, pick-up voltages.

5. The method of determining the strength of an unknown magnetic field comprising the steps of developing a magnetic field of known strength, developing electromotive forces proportional to the unknown field strength and to the magnetic field of known strength, combining said electromotive forces in opposition one to the other, and measuring the difference in said forces to determine the strength of the unknown magnetic field.

6. The method of measuring the strength of an unknown magnetic field, comprising rotating a coil in said field so as to generate a voltage, rotating a second coil in a field of known and variable flux density for generating another voltage, combining said voltages in bucking relationship, inducing a resultant voltage from said voltages, and measuring said resultant voltage to determine the strength of the unknown magnetic field.

7. In apparatus for measuring magnetic field strength, in combination, a rotatable shaft, a pair of spaced search coils mounted on the shaft, magnet means of fixed intensity for inducing a constant magnetic field across one of the coils, a transformer primary winding on the shaft and coaxial therewith connected in series with at least one of the search coils, and a stationary transformer secondary winding surrounding and coaxial with the primary winding.

8. In apparatus for measuring magnetic field strength, in combination, a rotatable shaft having at least two portions of non-magnetic material, search coils within said portions, a rotor mounted on another portion of the shaft having windings connected with at least one of said search coils, means to produce a magnetic field of fixed flux density through one of the coils, and a stator surrounding said rotor.

9. An electromagnetic device comprising a standard magnet, a coil disposed in the field of said magnet, a second coil to be disposed in the field of a magnet under test, said coils connected electrically in series-opposition, means to move said coils in unison, the first coil cutting the lines of force of the standard magnet and the second coil cutting the lines of force of the magnet under test, and means electrically connected to said coils to indicate the resulting electromagnetic manifestation.

10. An apparatus for measuring magnetic fields, which comprises means for creating a field of known strength and direction in a given location, a standard search coil, a testing search coil, a holder normally supporting the search coils in oriented positions such that the standard search coil is in a field created by the field-creating means and the testing search coil is spaced substantially from the field-creating means and in an unknown field for moving simultaneously the standard search coil through said known field and the testing search coil through the unknown field, whereby the standard search coil cuts the lines of force of said known field and the testing search coil cuts the lines of force of the unknown field, means for combining in series-opposition the electromotive forces generated in the search coils, and means responsive to electromotive force resulting from the combining of said forces for measuring the difference in the strengths of the two fields.

VIACHESLAW A. NEDZEL.

REFERENCES CITED

The following references are of record in the file of this patent:

UNITED STATES PATENTS

| Number | Name | Date |
|---|---|---|
| 277,087 | Varley | May 8, 1883 |
| 1,685,965 | Spooner | Oct. 2, 1928 |
| 1,954,975 | Zuschlag | Apr. 17, 1934 |
| 2,102,450 | Zuschlag | Dec. 14, 1937 |
| 2,231,810 | Kamenarovic | Feb. 11, 1941 |
| 2,359,894 | Brown et al. | Oct. 10, 1944 |
| 2,382,743 | Penther et al. | Aug. 14, 1945 |
| 2,397,935 | Gardiner et al. | Apr. 9, 1946 |